United States Patent [19]

Salvatore et al.

[11] 3,730,841

[45] May 1, 1973

[54] ENCAPSULATED CARRIER BOUND ENZYMES

[75] Inventors: Peter Salvatore, Forgione, Stamford, Conn.; Rocco Albert Polistina, Port Chester, N.Y.

[73] Assignee: American Cyanamid Company, Stamford, Conn.

[22] Filed: Mar. 24, 1971

[21] Appl. No.: 127,752

[52] U.S. Cl.................195/63, 195/DIG. 11, 195/68, 195/DIG. 11
[51] Int. Cl. ...............................................C07g 7/02
[58] Field of Search....................195/63, 68, DIG. 11

[56] References Cited

UNITED STATES PATENTS

| | | | |
|---|---|---|---|
| 3,649,457 | 3/1972 | Westman | 195/63 X |
| 3,282,702 | 11/1966 | Schreiner | 195/63 X |
| 3,639,306 | 2/1972 | Stetnberg et al | 195/63 X |
| 2,642,376 | 6/1953 | Gale et al. | 195/63 |

OTHER PUBLICATIONS

Change, T. M. S., Semipermeable Microcapsules, Science Vol. 146 1964 (pp. 524–525).

Suzuki, et al., Studies on the Water-Insoluble Enzyme Hydrolysis of Sucrose by Insoluble Yeast Invertase. Agr. Biol. Chem. Vol. 30, No. 8, 1966 (p. 807).

Tsumura, et al., Continuous Isomerization of Glucose by a Column of Glucose Isomerase. Journal of Food Science and Technology. Vol. 14, No. 12, 1967 (pp.539–540).

Kitajima, et al., Encapsulation with Polymeric Materials. Chemical Astracts Vol. 73, 1970 (p.43).

Primary Examiner—A. Louis Monacell
Assistant Examiner—David M. Naff
Attorney—Frank M. Van Riet

[57] ABSTRACT

Enzymes bound to carriers can be maintained active and the channelling and compacting of the bound enzyme can be substantially reduced by encapsulating the bound enzyme in a coating through which the substrate and its conversion product are permeable.

10 Claims, No Drawings

ENCAPSULATED CARRIER BOUND ENZYMES

BACKGROUND OF THE INVENTION

The binding of enzymes to suitable carriers in order to insolubilize said enzymes and thereby render them useful for the conversion of enzymatically convertible substrates has been of interest in recent years. Specifically, Silman et al., *Water-Insoluble Derivatives of Enzymes, Antigens and Antibodies*, Annual Review of Biochemistry, Vol. 35, Part II, P.D. Boyer, Editor; Annual Review Inc., Palo Alto, Calif.; pages 873–908; 1966, discuss many methods for binding enzymes to carriers, including adsorption, inclusion inside the lattice of the carrier, covalent binding and covalent cross-linking. In copending application Ser. No. 8,089, filed Feb. 2, 1970 by one of the instant inventors, and hereby incorporated herein by reference, these is disclosed a unique class of polymer bound enzymes and a method for their production. Said class of polymers and those commercially available in commerce, although of high activity, tend to compact and channel when utilized as such in processes wherein the bound enzyme is used to convert substrates to their conversion products, especially when the bound enzyme is contained in a contact column.

SUMMARY

We have now found that the catalytic activity of enzymes bound to carriers can be maintained and the channelling and compacting of the bound enzyme can be prevented or substantially reduced by encapsulating the bound enzyme in a coating through which the substrate and its conversion product is permeable. By "carrier bound enzyme" as used herein, is meant the product produced by binding an enzyme to a carrier by any of the four mechanisms mentioned above and described by Silman et al. in said article.

DESCRIPTION OF THE INVENTION INCLUDING PREFERRED EMBODIMENTS

The compositions which are encapsulated in permeable coatings according to our invention comprise a water-insoluble, hydrophilic carrier having a catalytically active enzyme bound thereto. Any carrier having these properties may be utilized herein and the enzyme may be bound thereto in any known manner, i.e., those mentioned above.

Those polymers containing reactive carboxylic acid and/or anhydride groups are among carriers useful herein. Polymers which may be used as carriers for the enzymes, including those mentioned in the above-identified publication, are such materials as aminoethylated cellulose, diazobenzyl cellulose, diazotized p-aminobenzyl cellulose, amino-s-triazine cellulose, acid chlorides of carboxylic or sulfonic acid ion-exchange resins, carboxymethyl cellulose azide, bromoacetyl cellulose, methacrylic acid-methacrylic acid-3-fluoro-4,6-dinitroanilide copolymers, the diazotized-m-aminobenzyloxymethyl ether of cellulose, diazotized poly-p-aminostyrene, the diazotized copolymer of p-aminophenylalanine and leucine, phosgenized poly-p-aminostyrene, ethylene-maleic anhydride copolymers, polyisothiocyanate derivatives of poly-p-aminostyrene, polystyrylmercuric acetate, acrylamide-methylene-bis acrylamide copolymer gels, polyacrylamide, poly-4-hydroxy-3-nitrostyrene and the like. Examples of other carriers which may be used include porous glass, asbestos, charcoal and the like. This listing is in no way to be considered as all-inclusive and any other known carriers may also be used herein.

These carriers are prepared depending, of course, upon the specific material being used, by rendering the material susceptible to reaction with the enzyme. In the case of most carbonyl polymers, for example, the polymer is first made water-soluble by reaction with a suitable solubilizing agent such as a bisulfite, specifically an alkali metal or alkaline earth metal bisulfite such as sodium, potassium, calcium etc. bisulfite. The reaction is conducted at a temperature ranging from about 25° C. to about 90° C., at atmospheric pressure, although superatmospheric or subatmospheric pressure can be utilized, if desired, the process being more specifically disclosed in U.S. Pat. No. 2,657,192, hereby incorporated herein by reference. After the bisulfite treatment, the carbonyl polymer is then made hydrophilic, such as by cross-linking. By the term "hydrophilic," as used herein, is meant that the carrier is made wettable or swellable in water but is not substantially soluble therein. The materials can contain hydrophobic members or portions provided that they also have hydrophilic portions which function as such when in contact with water. Any cross-linking agent or water-insolubilizing agent can be used for this purpose such as bis-diazobenzidine, bis-diazohexane, N,N'-(1,2-phenylene-bis-maleimide), phenol-2,4-disulfonyl chloride, m-xylylene diisocyanate, epichlorohydrin, p-nitrophenyl chloroacetate, tris[1-(2-methyl)aziridinyl]phosphine oxide, diamines such as hexamethylene diamine and the like. For example, the general procedure taught in U.S. Pat. No. 3,459,710, also hereby incorporated herein by reference, can be followed. In this method, the bisulfite-polymer adduct or reaction product is contacted with a diamine such as ethylene diamine, tetramethylene diamine, 1,6-hexane diamine, etc. at a temperature of about 0°–150° C. and in the presence of a solvent. If desired, the cross-linking step may be accomplished first and the bisulfite reaction second, the only criteria being that the resultant product is in such a state so as to allow reaction thereof with the enzyme. Insolubilizing the carrier can also be accomplished in a multiplicity of other ways such as by reaction with a polyunsaturated cross-linking agent such as divinyl benzene etc. or any other polyfunctional compound which will cause the formation of a network of polymeric structures via reaction with the carrier through available cross-linking sites. Grafting of the polymer carriers can also be accomplished to render them hydrophilic. Additionally, the insolubilizing can be effected by reacting the carrier material with such agents as 4-aminophenyl sulfide hydrochloride salt etc.

The enzyme is then reacted with the hydrophilic carrier at a temperature below that at which it, the enzyme, is deactivated. The temperatures at which specific enzymes are deactivated are well known to those skilled in the art and therefore need not be enumerated herein. Suffice it to say that generally temperatures below about 75° C., preferably from about 5° C. to about 65° C., should be used. The reaction is preferably carried out in the presence of buffers to control the pH of the reaction mixture at a desired level and with agitation, the particular pH being governed by the particular enzyme being bound, according to known techniques.

In regard to other carriers, especially the polymeric carriers, the same procedure specified above in regard to the carbonyl polymers may be utilized if the carriers per se are not sufficiently hydrophilic to enable them to be bound to the enzyme. That is to say, some materials are not per se water-soluble and since most enzymes are denatured by organic solvents and therefore any reaction therewith must be carried out in an aqueous medium, the carriers must be rendered hydrophilic before contact with the enzyme. Reactions of this general type are shown in U.S. Pat. No. 3,271,334, also hereby incorporated herein by reference.

When the carrier polymer is per se water-soluble, the bisulfite reaction need not be conducted and the enzyme can be contacted with the carrier immediately after rendering it insoluble, such as by cross-linking as discussed above. Water-solubilizing and cross-linking need not be accomplished, of course, if the carrier is per se hydrophilic. The basic requirement is that the final bound enzyme material must be hydrophilic in order that it may be utilized in the enzymatic conversion of substrates to their conversion products.

In a specific embodiment of the preparation of carrier bound enzyme products, polyacrolein, a water-insoluble polymer which contains some groups with which most enzymes are reactive, must be first contacted with a bisulfite such as sodium bisulfite in order to render it water-soluble. In such a condition, however, the polymer cannot be reacted with an enzyme because recovery of any product thereof is relatively impossible. Cross-linking of the bisulfite-polymer product, however, renders it gel-like in consistency and effectively hydrophilic so as to allow reaction with the enzyme. As a result, the bisulfite-polyacrolein product is preferably cross-linked with a diamine such as hexamethylene diamine. The result of these two reactions is believed to be that the bisulfite breaks some of the heterocyclic rings of the polyacrolein creating more enzyme-reactive aldehyde groups thereon, in addition to a series of bisulfite groups. The diamine reacts with some of these aldehyde groups with the formation of — CH=N— linkages between two polymer molecules, thereby cross-linking the polyacrolein. Reaction of the enzyme, e.g. invertase, forms an adduct or covalent bond between the enzyme and the other available aldehyde groups, and also may result in reaction through the bisulfite groups. The resultant adduct is then comprised of a series of cross-linked groups, free aldehyde groups, heterocyclic bisulfite reaction groups and bound enzyme groups.

Examples of carbonyl polymers which are preferred for use herein include those produced according to any known procedure from such aldehyde monomers as acrolein; α-alkyl acroleins, e.g. methacrolein, α-propylacrylein; crotonaldehyde; 2-methyl-2-butenal; 2,3-dimethyl-2-butenal; 2-ethyl-2-hexenal; 2-decenal; 2-dodecenal; 2-methyl-2-pentenal; 2-tetradecenal and the like, alone or in admixture with up to 95 percent, by weight, based on the total weight of the copolymer, of each other and/or such other copolymerizable monomers known to react therewith such as unsaturated alcohol esters, e.g. the allyl, crotyl, vinyl, butenyl etc. esters of saturated and unsaturated aliphatic and aromatic monobasic and polybasic acids such as acetic, propionic, butyric, valeric, adipic, maleic, fumaric, benzoic, phthalic, terephthalic, etc. acids; vinyl cyclic compounds (including monovinyl aromatic hydrocarbons) e.g. styrenes, o-, m-, and p-chlorostyrenes, -bromostyrenes, -fluorostyrenes, -methylstyrenes, -ethylstyrenes, various polysubstituted styrenes, e.g. di-, tri-, and tetra-chlorostyrenes, -bromo-styrenes, etc.; vinyl naphthalene, vinyl chloride, divinyl benzene, allyl benzene, vinyl pyridine, diallyl benzene, various α-substituted and α-substituted, ring-substituted styrenes, e.g. α-methyl styrene, α-methyl-p-methyl styrene, etc.; unsaturated ethers, e.g. ethylvinylether, etc.; unsaturated amides e.g. acrylamide, methacrylamide etc.; N-substituted acrylamides e.g. N-methylolacrylamide, N-allyl acrylamide, N-methyl acrylamide, etc.; acrylates such as the methyl, ethyl, propyl, butyl, etc. acrylates and methacrylates; nitriles such as acrylonitrile and other comonomers shown, for example, in U.S. Pat. No. 2,657,192 mentioned hereinabove.

Examples of other preferred carbonyl polymers which may be utilized include those produced according to any known procedure and in amounts similar to those indicated above in regard to the aldehyde polymers from such ketone monomers as methyl vinyl ketone, methyl allyl ketone, ethyl vinyl ketone, methyl isopropenyl ketone, ethyl allyl ketone, etc. phenyl vinyl ketone, p-tolylvinyl ketone. Also, we may use such polymers as poly(vinylpyridinium ketones) and haloketones; copolymers of the above-mentioned aldehyde monomers and ketone monomers with or without the above-disclosed copolymerizable comonomers; polyacetal and the like. The molecular weights of the polymers used is not critical and those as low as 1,000 can be used.

Similarly, such polymers as the copolymers of ethylene and carbon monoxide and various glyoxal adducts, all well known in the art, can be utilized herein.

Exemplary of the enzymes which may be utilized to produce the materials encapsulated herein include proteolytic enzymes, hydrolases, amylases, dehydrogenases, kinases, oxidases, deaminases, amidases, antigens, antibodies etc. including lactic dehydrogenase, creatine, phosphokinase, trypsin, papain, alk. phosphatase, amyloglucosidase, dextranase, glucose oxidase, amidase, penicillin amidase, chymotrypsin, β-galactosidase, pyruvate kinase, ficin, pepsin, carboxypeptidase, streptokinase, plasminogen, urease, invertase, alcohol dehydrogenase diastase, β-glycosidase, maltase, aldolase, lactase, amygdalase, lipase, steapsin, erepsin, zymase, catalase, melibiase, pectolase, protease, tyrosinase, L-asparaginase, glucose isomerase, cytase, adenase, guanidase, carboxylase, inulase, vinegar oxidase, aldehydase, rhamnase, myrosinase, phytase, tannase, carbamase, nuclease, guanase, adenase, thrombase, chymase, cozymase and the like.

As mentioned briefly above, the carrier bound enzymes become compacted or channelled when in use and in such a condition cannot effectively function in the normal (natural) manner so as to convert substrates to their usual conversion products. We have found that by encapsulating the carrier bound enzyme in a self-supporting coating which is permeable to both the substrate normally converted to its conversion product by the enzyme and the conversion product, the channelling is materially reduced and the necessity for repacking or agitation of columns containing the bound enzyme during converting processes is obviated.

The encapsulated carrier bound enzyme can be packed in a suitable reaction column while still retaining the catalytic activity of the enzyme. Thus, for example, polymer bound invertase can be encapsulated in an acrylamide-methylene bisacrylamide coating, packed in a suitable column and can then be utilized to continuously convert sucrose to invert sugar. The catalytic activity of the invertase has thereby been maintained and the need for repacking or continuously agitating the column so as to allow continual and complete contact of the sugar with the enzyme is done away with. By "catalytically active" or "active catalytic activity," as utilized herein, is meant the ability or availability of the bound enzyme to convert a particular substrate to its usual conversion product.

The bound enzymes may be encapsulated by any procedure known to those skilled in the art, e.g. U.S. Pat. Nos. 2,712,507; 2,730,457 and U.S. Pat. No. Re. 24899, which patents are hereby incorporated herein by reference. Encapsulating machines may be utilized, for example, or, more preferably, the bound enzyme may be coated by polymerization (or other means of production) under known reaction conditions, of the coating material in the presence of particles of said bound enzyme. In this manner, the bound enzyme is coated with the polymer produced during polymerization and the resultant capsules may be recovered by filtration etc. and dried. The materials which may be used to encapsulate the bound enzymes should be tack-free and insoluble in the substrate or substrate solution or, at least, water-resistant thereto, in order to prevent the washing away and ultimate over exposure of the bound enzyme adduct.

The encapsulation is preferably conducted in the presence of an emulsifying agent such as the sodium salt of dodecyl benzene sulfonate etc. to assure particle retention. In order to maintain the enzyme activity at its peak over the period of time between encapsulation and use, we have also found that the incorporation of a small amount, i.e., 1-15 percent, by weight, based on the weight of the enzyme bound, of the substrate which is normally converted to its conversion product by the enzyme into the bound material is effective. For example, in the case of invertase, a small amount of sucrose would be encapsulated therewith. The substrates which are useful in each specific instance are well known to those skilled in the art. Particle sizes ranging from about 5 microns to about 200 microns are satisfactory for encapsulation.

Examples of suitable coating materials include the alginates such as sodium alginate etc., the celluloses such as ethyl cellulose, carboxymethyl cellulose, ethyl, β-hydroxyethyl cellulose, nitrocellulose (collodian) etc., vinyl polymers such as vinyl pyrrolidone-vinyl acetate polymers, polyamides, e.g. adipic acid-hexamethylenediamine reaction products (nylons), acrylamide-methylenebisacrylamide polymers and the like.

Incorporation of various preservatives such as antimicrobials, antioxidants, antibiotics etc., into the bound enzymes for the prevention of bacteria formation, fungal growth etc., as is known in the art, may also be effected in concentrations of less than about 1.0 percent, by weight, based on the total weight of the bound enzyme. Examples of suitable additives include benzoic acid and its sodium and potassium salts; alkyl esters of p-hydroxybenzoic acid; propionates such as sodium propionate; sodium bisulfite; sodium metabisulfites; sodium diacetate; o-phenylphenol; butylated hydroxyanisole; lecithin; citrates such as monoglyceride citrate, stearyl citrate etc.; oxytetracycline chlortetracycline; benzyl alcohol; calcium sorbate; sorbic acid, mixtures thereof and the like.

The following examples are set forth for purposes of illustration only and are not to be construed as limitations on the present invention except as set forth in the appended claims. All parts and percentages are by weight unless otherwise specified.

EXAMPLE 1

0.88 Part of 1,6-hexane diamine, containing 3 parts of water, is slowly added, with stirring, to 44 parts of a 10 percent solution of polyacrolein-sodium bisulfite adduct (m.w. 80,000). The mixture is then heated to 85° C., for 20 minutes and the yellow hydrophilic product which forms is then washed until neutral with distilled water and filtered.

The wet hydrophilic adduct thus obtained is suspended in 50 parts of water and reacted with 0.104 part of invertase (twice recrystallized) which had been first dissolved in 4 parts of water. The enzyme reaction mixture (pH 6.5) is gently stirred for 18 hours at 10° C. and the resulting hydrophilic covalently bound enzyme polymer adduct is then washed free of unreacted enzyme. Assay of the hydrophilic enzyme-polymer adduct shows high activity with sucrose solution, in the form of the filtered wet cake. This cake is packed in a reaction column and a sucrose solution is continuously charged to the column. After 72 hours of continual operation, the bound enzyme is channelled to such an extent that conversion of sucrose to invert sugar drops from 92 to 60 percent.

EXAMPLE 2

A charge of 35 parts of a mixture of 95 percent acrylamide and 5 percent methylenebisacrylamide is added to a suitable vessel containing 4,000 parts of water. The resultant solution is purged with nitrogen gas, stirred and the following materials added in the order listed:

A. 1.75 parts of dimethylaminopropionitrile activator,

B. 3.5 parts of inhibitor-free styrene (utilized to impart a greater degree of hardness in the acrylamide polymer as is known in the art), C. 7.0 parts of the filtered wet cake of bound invertase produced as in Example 1, D. 3.5 parts of sucrose (utilized to maintain enzyme activity), E. 50.0 parts of a 2.0 percent aqueous solution of the sodium salt of dodecyl benzene sulfonate, an anionic surfactant, and F. 3.5 parts of ammonium persulfate in 20.0 parts of water, a known initiator.

Upon completion of the persulfate addition, the resultant reaction media is stirred at moderate speed for 30 minutes and at 35° C. in order to dispense the adduct as small particles of about 15-50 microns. Upon completion of the polymerization (about one hour), the resultant encapsulated particles are filtered and washed with large amounts of water. The capsules containing the bound enzyme are packed into a reaction column and a sucrose solution is continuously charged to the column as in Example 1. After 920 hours, the conversion of sucrose to invert sugar drops from 91 to 88 percent.

EXAMPLE 3

Following the procedures of Examples 1 and 2, polyacrolein bound glucose oxidase is prepared and encapsulated. The sucrose of Example 2 is replaced with 10.0 parts of a 40 percent glucose solution. After a similar length of time in a packed column, the encapsulated adduct retained 98 percent of its activity. A similar column of non-encapsulated adduct shows channelling and unsatisfactory conversion in 48 hours.

EXAMPLE 4

Again following the procedures of Examples 1 and 2 and replacing the sucrose with 10.0 parts of a 40 percent glucose solution, assay of the encapsulated adduct shows 85 percent retention of its activity after a similar length of time. When a column of non-encapsulated adduct of similar ingredients is utilized, channelling and decreased conversion result in 3 days.

EXAMPLE 5

To a suitable reaction vessel equipped with a magnetic stirrer are charged 800 parts of water and 5 parts of a 95 percent acrylamide-5 percent methylenebisacrylamide mixture. The resultant solution is flushed with nitrogen and moderately stirred. To the solution are then added the following ingredients in the order specified:

A. 0.25 part of dimethylaminopropionitrile activator,
B. 1.5 parts of inhibitor-free styrene,
C. 1.0 part of polyacrolein-glucoamylase adduct produced as in Example 1,
D. 10.0 parts of a 25 percent starch solution,
E. 12.5 parts of a 2 percent solution of the sodium salt of dodecyl benzene sulfonate and
F. 2.5 parts of ammonium persulfate.

The resultant reaction media is stirred for 15 minutes at 35° C. to initiate polymerization and maintain the particle size. After 45 minutes, the resultant encapsulated adduct is recovered by filtration and washed with water. After use as in Example 2 in a packed column, assay of the resultant capsules shows a 33 percent retention of original activity. A column of non-encapsulated adduct loses about all of its activity in 2½ days.

EXAMPLE 6

To a suitable reaction vessel set in an ice bath are charged 0.1 part of blood serum and 1.5 parts of water. The resultant suspension is stirred slowly and 1.0 part of a press-dried polyacrolein-invertase adduct produced as in Example 1 is added. Stirring is continued for 3 minutes and 1.0 part of 1.5M hexamethylene diamine in 0.45M carbonate solution buffered at pH 9.9 is added. After further stirring for 2 minutes, 15.0 parts of a 4:1 cyclohexane/chloroform solution containing 1 percent sorbitan trioleate emulsifier are added. Stirring is continued at a rate of speed necessary to form 25 micron sized droplets for one minute and 15.0 parts of a 0.4 percent solution of sebacoyl chloride in 4:1 cyclohexane/chloroform are added. Stirring is continued for 7 minutes and then 30 parts of 4:1 cyclohexane/-chloroform containing 1 sorbitan trioleate are added. The resultant encapsulated adduct pellets are allowed to settle and the supernatant liquid is decanted. The pellets are intimately mixed with a 50 percent aqueous solution of polyoxyethylene (20) sorbitan monolaurate. 50 Parts of water are added, the resultant media is centrifuged and the supernatant liquid is decanted. The capsules are then washed with water four times, recovered and packed into a reaction column. A sucrose solution is continuously charged through the column as in Example 1. After 872 hours, the conversion of sucrose to invert sugar is 80 from 88 percent originally.

EXAMPLE 7

5 Parts of a copolymer of acrolein-styrene (93.8:6.2 weight ratio, respectively) are suspended in 40 parts of water containing 4.3 parts of sodium metabisulfite at pH 5.7. The mixture is stirred over nitrogen at 65° C. for 5 hours, resulting in a completely water-soluble product. To this bisulfite addition product is slowly added, with stirring, 2 parts of 1,6-hexane diamine dissolved in 10 parts of water. The reaction mixture is stirred at 70° C. for 1 hour. The resultant cross-linked, hydrophilic copolymer is filtered, washed to neutral pH and reacted with 5 ml. of technical grade ($k$=0.6) invertase at 18° C. for 15 hours. After encapsulation as in Example 2 and introduction into a column the bed functions effectively in the conversion to invert sugar for 28 days without repacking or substantial agitation.

EXAMPLE 8

The procedure of Example 7 is again followed except that 10 parts of a copolymer of acrolein-acrylonitrile (93.1:6.9 weight ratio, respectively) are used as the polymeric material. The bound enzyme product is recovered and encapsulated as in Example 2. A column of the product functions 580 hours without repacking.

EXAMPLE 9

The procedure of Example 7 is again followed except that the polymer is produced from 10 parts of a copolymer of acrolein-acrylic acid (85:15 weight ratio, respectively). Similar results are recorded.

EXAMPLE 10

Substitution of polymethacrolein for the polymer of Example 2 results in an encapsulated bound enzyme product, the effectiveness of which is maintained for 820 hours in a column.

EXAMPLE 11

The procedure of Example 2 is again followed except that a methacrolein-styrene (50:50) copolymer (U.S. Pat. No. 2,945,006) is substituted for the polymer used therein. Excellent results are achieved.

EXAMPLE 12

10 Parts of poly(methylvinyl ketone) are treated with 80 parts of water containing 8 parts of sodium bisulfite at pH 5.8 at 65° C. for 18 hours over a nitrogen atmosphere. The resulting bisulfite adduct is then treated with 1.6 parts of ethylene diamine dissolved in 16 parts of water, with stirring, for 25 minutes at 65° C. The hydrophilic polymer is then washed to neutral pH and filtered. The wet cake is suspended in 55 parts of water and reacted with 4 ml. of technical grade invertase ($k$=0.6) at 18° C. for 16 hours. The resulting covalently bound enzyme polymer adduct is washed free of unbound invertase with distilled water and filtered (18.2 g. wet). The adduct is separated into two portions. One portion is encapsulated as in Example 2 and both portions are packed in columns and contacted with 10 percent aqueous sucrose solution for 280 hours. The encapsulated adduct affords 80 percent conversion to invert sugar while the non-encapsulated adduct yields less than 5 percent conversion at the same flow rate.

Following the procedures of Example 2 or Example 12 except that various copolymers or other homopolymers are substituted for the polymers utilized therein, bound invertase compositions are prepared, encapsulated, contacted with a 15 percent aqueous sucrose solution and used in a packed column for the conversion of sucrose to invert sugar. The results are set forth in Table I, below.

TABLE

| Ex. | Carbonyl Polymer | No. hours without need for repacking or substantial agitation of Packed Column |
|---|---|---|
| 13 | Acrolein-allyl glycolate (80/20) | 420 |
| 14 | Acrolein-β-allyloxyethanol (80/20) | 670 |
| 15 | Acrolein-methylvinyl ketone (45/55) (m.w. 1400) | 610 |
| 16 | Poly(vinylethyl ketone) | 500 |
| 17 | Poly(isopropenylmethyl ketone) | 380 |
| 18 | Acrolein-ethyl acrylate-styrene ((25/20/55) | 750 |
| 19 | Methylvinyl ketone-vinyl acetate (5/95) | 350 |
| 20 | Acrolein-methyl acrylate (40/60) | 670 |
| 21 | Acrolein-glycidyl methacrylate (40/60) | 476 |
| 22 | α-methyl acrolein-methyl methacrylate (50/50) | 500 |
| 23 | Acrolein-butadiene (50/50) | 520 |
| 24 | Acrolein-vinyl acetate (60/40) | 820 |

EXAMPLE 25

10 Parts of wet ($\approx$10 percent solids) cross-linked polyacrolein-sodium bisulfite addition complex (as prepared in Example 1) are suspended in 40 parts of water at pH 3.5 and reacted with 0.110 part of crystalline trypsin, dissolved in 4 parts of water. The reaction mixture is stirred for 18 hours at 10° C. and at the end of this time the resulting covalently bound trypsin adduct is washed until free of unbound enzyme. Analysis of the washings at 280 mμ indicates that 78.2 percent of the enzyme is bound to the polymer. The wet polymer enzyme cake is encapsulated as set forth in Example 6. When packed in a column utilizing benzoyl arginine ethyl ester (BAEE) substrate, the enzyme capsules are shown to be effective after 20 days of continual use.

EXAMPLE 26

2.5 Parts of poly(isopropenylmethyl ketone) are stirred with 25 parts of water containing 2.1 parts of potassium metabisulfite at pH 5.8 for 16 hours at 75° C. over a nitrogen atmosphere. At the end of this time, 1.3 parts of 2-(2-aminoethyl)-5(6)-aminoethylbicyclo - 2.2.1 heptane in 5 parts of water are added to the above reaction mixture and stirred at 80° C. for 25 minutes. The hydrophilic adduct which results is washed to neutral pH and filtered. The wet cake is suspended in 30 parts of water and reacted with 0.025 part of glucose oxidase dissolved in 2 parts of water at 10° C. for 18 hours. The resultant covalently bound enzyme is washed free of unbound glucose oxidase with cold distilled water and filtered. The resultant wet filter cake is then encapsulated as in Example 2. The results are similar to those shown in Example 2.

EXAMPLE 27

40 Parts of distilled acrolein and 20 parts of a commercially available low molecular weight unsaturated polyester of maleic acid and dipropylene glycol containing 30 percent of vinyl toluene are combined with 0.5 part of α,α'-azobis-α,α-dimethyl-valeronitrile and allowed to polymerize at room temperature for 4 days under a nitrogen atmosphere. The resulting solid cross-linked plug is chopped up to 100 mesh pieces, washed with water and filtered. A portion (10 parts) of this polyacrolein graft is treated with 8.5 parts of sodium metabisulfite and 90 parts of water at pH 5.6 at 62° C. for 18 hours over a nitrogen atmosphere. At the end of this time the hydrophilic sodium bisulfite adduct is isolated by filtration and washed with water. The wet adduct is suspended in 50 parts of water and treated with 4 ml. of technical grade invertase ($k$=0.6) at 15° C. for 16 hours. The reaction mixture is washed free of unbound enzyme and the resultant bound enzyme is encapsulated as in Example 2. Similar results are recorded.

EXAMPLE 28

90 Parts of acrolein are reacted at room temperature with 10 parts of methylene bisacrylamide and 0.1 part of α, α'-azobis-α,α-dimethylvaleronitrile for 3 days under a nitrogen atmosphere. The resultant solid, cross-linked copolymer (8.3 percent weight percent bisacrylamide) is washed with water, filtered and dried at room temperature to constant weight. 10 Parts of the dried, cross-linked copolymer are then treated with 8.6 parts of sodium metabisulfite dissolved in 82 parts of water at pH 5.6 at 65° C. with stirring for one day over nitrogen. The resultant hydrophilic bisulfite adduct is filtered and washed with water. The wet bisulfite adduct (147 parts) is suspended in 150 parts of water and treated with 12 ml. of technical invertase solution ($k$=0.6 with stirring at 10° C. for 18 hours. The reaction mixture is washed free of unbound invertase and encapsulated as set forth above in Example 2. Excellent maintenance of enzyme activity and the prevention of channelling in the packed column is achieved.

Following the techniques of the previous examples, various other enzymes are bound to polymeric materials to produce a hydrophilic composition which is then encapsulated in an appropriate material. In each instance, the activity and freedom from channelling of the resultant capsules is excellent. The results of these runs are set forth in Table II, below.

TABLE II

| Example | Enzyme bound as in example No. | Enzyme | Bound enzyme encapsulated as in example No. |
|---|---|---|---|
| 29 | 1 | lipase | 2 |
| 30 | 7 | L-asparaginase | 2 |
| 31 | 8 | catalase | 2 |
| 32 | 17 | tyrosinase | collodian used |
| 33 | 22 | maltase | 6 |

EXAMPLE 34

A commercially available polymer bound enzyme comprising chymotrypsin on carboxymethyl cellulose is suspended in a 1.0 percent aqueous casein solution at 5° C. The suspension is encapsulated as set forth in Example 2. The activity of a column packed with the resultant capsules is evident 30 days after continual operation. Substantially no channelling is observed.

EXAMPLES 35–47

Other water-insoluble, hydrophilic carrier bound enzymes are encapsulated as specified and utilized in the conversion of substrates to their normal conversion products. In each instance, minimum channelling results and the activity of the encapsulated enzyme remains nearly normal after 20 days. The carrier bound enzymes encapsulated are:

35. glucose isomerase adsorbed on asbestos in a 5.0 percent aqueous glucose solution and encapsulated as in Example 2.

36. pepsin bound to poly-p-aminostyrene in a 1.5 percent aqueous casein solution and encapsulated as in Example 2.

37. papain covalently coupled to the water-insoluble diazonium salt of a p-amino-DL-phenylalanine-L-leucine copolymer in a 1.0 percent aqueous hemoglobin solution and encapsulated as in Example 2.

38. trypsin entrapped in an acrylamide-methylenebisacrylamide gel in a 2.0 percent casein (aqueous) solution and encapsulated as in Example 6.

39. trypsin bound to bromoacetyl cellulose in a 1.0 percent aqueous casein solution and encapsulated as in Example 6.

40. ficin bound to carboxymethyl cellulose in a 1.0 percent aqueous casein solution and encapsulated as in Example 2.

41. L-asparaginase adsorbed in the pores of porous glass in a 2.0 percent aqueous L-asparagine solution and encapsulated as in Example 32.

42. chymotrypsin bound to p-amino-DL-phenylalanine-L-leucine copolymer in a 1.0 percent aqueous casein solution and encapsulated as in Example 6.

43. invertase bound to methacrylic acid-methacrylic acid-3-fluoro-4,6-dinitroanilide copolymer in a 10 percent aqueous sucrose solution and encapsulated with sodium alginate.

44. glucoamylase bound to carboxymethyl cellulose azide in a 15 percent aqueous starch solution and encapsulated in a vinyl pyrrolidone/vinyl acetate (90/10) copolymer.

45. papain bound to collagen cross-linked with benzidine in a 1.0 percent aqueous gelatin solution and encapsulated in carboxymethyl cellulose.

46. chymotrypsin bound to p-aminobenzyl cellulose in a 1.0 percent aqueous casein solution and encapsulated as in Example 2.

47. trypsin adsorbed on charcoal in a 1.5 percent aqueous hemoglobin solution and encapsulated as in Example 6.

We claim:

1. An article of manufacture comprising a water-insoluble, hydrophilic, catalytically active carrier bound enzyme material having a particle size of about 5 to about 200 microns encapsulated by a self-supporting coating through which a substrate normally converted to its conversion product by the bound enzyme and said conversion product are permeable.

2. An article according to claim 1 wherein said carrier is a carbonyl polymer.

3. An article according to claim 1 wherein said carrier is an aldehyde polymer.

4. An article according to claim 1 wherein said carrier is an acrolein polymer.

5. An article according to claim 1 wherein said enzyme is invertase.

6. An article according to claim 1 wherein said coating is an acrylamide polymer.

7. An article according to claim 1 wherein said coating is a polyamide resin.

8. An article according to claim 1 wherein said enzyme is glucose isomerase.

9. An article according to claim 1 wherein said coating is an acrylamide-methylenebisacrylamide copolymer modified with styrene.

10. An article according to claim 9 wherein said enzyme is invertase and said carrier is polyacrolein.

* * * * *

UNITED STATES PATENT OFFICE
CERTIFICATE OF CORRECTION

Patent No. 3,730,841          Dated May 1, 1973

Inventor(s) Peter Salvatore Forgione and Rocco Albert Polistina

It is certified that error appears in the above-identified patent and that said Letters Patent are hereby corrected as shown below:

Under United States Patent "Salvatore et al" should read -- Forgione et al --.

After Inventors: "Peter Salvatore, Forgione," should read -- Peter Salvatore Forgione, --.

Signed and sealed this 1st day of January 1974.

(SEAL)
Attest:

EDWARD M. FLETCHER, JR.          RENE D. TEGTMEYER
Attesting Officer                Acting Commissioner of Patents